United States Patent
Boyle et al.

(10) Patent No.: US 10,943,321 B2
(45) Date of Patent: Mar. 9, 2021

(54) METHOD AND SYSTEM FOR PROCESSING IMAGE DATA

(71) Applicant: Cathx Research Ltd, County Kildare (IE)

(72) Inventors: Adrian Boyle, County Kildare (IE); Marie Flynn, County Kildare (IE); Michael Flynn, County Kildare (IE)

(73) Assignee: Cathx Research Ltd, County Kildare (IE)

(*) Notice: Subject to any disclaimer, the term of this patent is extended or adjusted under 35 U.S.C. 154(b) by 195 days.

(21) Appl. No.: 16/069,857

(22) PCT Filed: Nov. 14, 2016

(86) PCT No.: PCT/EP2016/077608
§ 371 (c)(1),
(2) Date: Jul. 12, 2018

(87) PCT Pub. No.: WO2017/081327
PCT Pub. Date: May 18, 2017

(65) Prior Publication Data
US 2019/0019266 A1    Jan. 17, 2019

(30) Foreign Application Priority Data
Nov. 13, 2015 (GB) .................................. 1520023

(51) Int. Cl.
*G06T 1/00* (2006.01)
*G06K 9/00* (2006.01)
*G06N 20/00* (2019.01)

(52) U.S. Cl.
CPC ........ *G06T 1/0014* (2013.01); *G06K 9/00771* (2013.01); *G06K 9/00973* (2013.01);
(Continued)

(58) Field of Classification Search
CPC . G06T 1/0014; G06T 1/0007; G06T 9/00973; G06T 9/00771; G06N 20/00; G06K 9/00771; G06K 9/00973
See application file for complete search history.

(56) References Cited

U.S. PATENT DOCUMENTS

| | | | |
|---|---|---|---|
| 2011/0007946 A1* | 1/2011 | Liang | A01K 1/031 382/103 |
| 2013/0151135 A1* | 6/2013 | Aubrey | G08G 1/0116 701/118 |
| 2016/0070991 A1* | 3/2016 | Galera | G06K 9/52 348/77 |

FOREIGN PATENT DOCUMENTS

WO    2014060562 A1    4/2014

OTHER PUBLICATIONS

International Search Report received in PCT/EP2016/077608, dated Mar. 22, 2017, 3 pages.
(Continued)

*Primary Examiner* — Wayne H Cai
(74) *Attorney, Agent, or Firm* — ARC IP Law, PC; Joseph J. Mayo (57) ABSTRACT

Provided are a method and system for processing image data, the method comprising: capturing raw image data of multiple images of one or more scenes under one or more lighting conditions; machine vision processing the raw image data to generate machine vision data; classifying the machine vision data according to a type of the machine vision data; and storing the classified machine vision data in a multi-tiered data structure according to the machine vision data type, configured to enable each of the tiers of data to be processed independently of each other.

27 Claims, 5 Drawing Sheets

(52) U.S. Cl.
CPC ........... *G06N 20/00* (2019.01); *G06T 1/0007* (2013.01); *G06T 2200/04* (2013.01)

(56) References Cited

OTHER PUBLICATIONS

Ying-Li Tian et. Al, "IBM smart surveillance system (S3): event based video surveillance system with an open and extensive framework", Machine Vision and Applications, Springer, Berlin DE, Jun. 24, 2008, pp. 315-327.

\* cited by examiner

METHOD AND SYSTEM FOR PROCESSING IMAGE DATA

FIELD

The present invention is related to data processing and storage for images, and specifically to machine vision processing of video or image sequences as acquired from a fixed or moving platform with one or more imaging devices.

BACKGROUND OF THE INVENTION

The acquisition of digital images has become a popular approach for capturing, storing, managing, and sharing images. Digital images may be captured by devices such as mobile phones, personal digital assistants ("PDAs"), digital cameras and digital video cameras. Such devices may be useful for the specific function of capturing a single digital image or a series of digital images (i.e., video). The ability to share and store captured images has also improved along with wireless network coverage and speed, as well as the development and growth of online photo-sharing and social media services. An individual may capture a photographic image at any time and immediately upload that photographic image to a photo-sharing service such that the photographic image may be shared with one or more people without requiring significant effort or technical training. Mobile applications that facilitate photo-sharing have become very popular.

Machine vision techniques can be applied to captured images. Machine vision refers to the ability of a machine or computer to extract information from an image or a series of images and potentially to base machine decisions on the information extracted. Machine vision image processing methods include stitching/registration, filtering, edge detection, optical character recognition, pattern recognition, etc. Previous disclosures by the present Applicant relate to the use of machine vision techniques involving sequences of images, laser, light and other sources. These include WO2014/060562, WO2014/060564, and WO2014/063999.

In order to find particular images within a set of digital images, a user may conduct an "image search." Such image searches typically operate based on tags associated with the images being searched. For example, tags may be used to indicate objects (e.g., people) displayed in the images, and a search for particular objects may return a subset of images that have the searched-for objects "tagged" in the images.

Conventional techniques of retrieving stored images comprise identifying a stored photographic image and metadata associated with the image. The metadata may include a location and an orientation of an imaging device when the stored image was captured. A target photographic image to be requested may be identified, wherein a description of the target photographic image is derived from the metadata of the stored photographic image and includes a target location and a target orientation.

Digital photographic images may be stored on a computer readable storage medium, such as a hard disk drive or flash memory, and displayed on a display device, such as a liquid crystal display (LCD). Photographic images that are originally captured using a digital image acquisition device may automatically store metadata in association with the photographic image. Examples of such metadata include the location where the photographic image was taken, the time and date when the photographic image was taken, and any other data that the imaging device is able to access and store. Most mobile communication devices nowadays have a built-in digital camera. These mobile communication devices have many other capabilities which are rapidly expanding. Modern mobile communication devices also generally include global positioning system (GPS) capabilities, such that the location where a photographic image is taken may be stored in terms of a standard coordinate system, such as longitude and latitude, measured by the GPS.

The metadata may include any data that can be captured directly or indirectly by the image acquisition device. Such data may be referred to as direct metadata and indirect metadata. Direct metadata may be obtained directly by sensors or components within the mobile communication device. For example, a microphone might measure a sound level at the moment the photographic image was taken, or an accelerometer might measure movements of the mobile communication device at the same moment. Other direct metadata may be related to the digital camera settings used to take the photographic image, digital camera capabilities or specifications, or the size, resolution or quality of the digital file. Direct metadata related to the digital camera settings may be included with images, e.g. frame rate, exposure, depth of field, identification of image acquisition device, and temperature. However, these devices may not be capable of capturing all information related to the subject matter of the digital image or digital video. In this regard, metadata captured indirectly by a mobile communication device may be referred to as indirect metadata. Such indirect metadata may include data obtained by another communication means, such as a wireless mobile communication network or a wireless local area connection (LAN). Wireless communication may provide the mobile communication device with a connection to a global communication network, such as the Internet, and thus it is possible for the indirect metadata to include any data available on the Internet. For example, while a mobile communication device can be configured to directly measure barometric pressure with an onboard barometer, the mobile communication device may also be configured to obtain the current barometric pressure for the current location indirectly through a network connection with a weather service. With this network connection, the mobile communication device may be configured so that the current barometric pressure is obtained and stored as metadata along with each photographic image.

In view of the above, there is a need for a system in which image-related data can be efficiently stored and retrieved.

SUMMARY

According to the present disclosure there is provided a method as detailed in claim 1. Also provided is a system in accordance with claim 41. Advantageous features are recited in the dependent claims.

The present disclosure relates to how large volumes of image data are processed and broken down into smaller discrete blocks of data ('data of interest') and stored in a multi-tiered data structure, thereby enabling efficient storage, access, retrieval, transmission and analysis of image data. The storage and detection of machine vision features for assembly into a data structure allows efficient storage, retrieval, visualisation, and analysis. A key to the data segregation being robust is the methods used to fill the data structure.

BRIEF DESCRIPTION OF THE DRAWINGS

The present application will now be described with reference to the accompanying drawings in which.

DETAILED DESCRIPTION OF THE DRAWINGS

The present disclosure relates to the processing of images using machine vision techniques and the storage of the extracted machine vision data. Specifically, it relates to the processing of video or image sequences as captured from fixed or moving platforms with one or more image acquisition devices. The images may also contain geographic position data, telemetry data and time-based data. The images are processed using machine vision techniques to generate machine vision processed data, also known as machine vision data. The machine vision data is classified according to machine vision type and broken down into smaller discrete blocks of data and stored in a multi-tiered prioritised data structure. The storage of the discrete blocks of data in a multi-tiered data structure enables each of the discrete blocks or tiers of data to be processed independently of each other. More specifically, the storage of the discrete blocks of data in a multi-tiered data structure enables efficient storage, access, retrieval, transmission and analysis of each of the tiers of data independently of each other.

The present disclosure provides a complete method and system for machine vision detection, segregation, storage, retrieval and visualisation of data acquired using a sequential imaging system with the objective of performing this processing in real time. However, in addition, any multi-sensor system that allows data to be acquired with common time stamp and or position data may be processed in a similar way. The imaging system may comprise a white light source, a laser source and potentially other light sources. Additional related data may include multi-beam sonar (underwater) or thermographic images (surface) for example.

Accordingly the present disclosure provides a method and system for processing image data, the method comprising: capturing raw image data of multiple images of one or more scenes under one or more lighting conditions; machine vision processing the raw image data to generate machine vision data; classifying the machine vision data according to a type of the machine vision data; and storing the classified machine vision data in a multi-tiered data structure according to the machine vision data type, configured to enable each of the tiers of data to be processed independently of each other.

In the context of the present application, raw image data refers to unprocessed images. These may be RAW (uncompressed) or compressed formats such as JPEG, PNG and other standard formats for example.

The types of machine vision data detected and classified may include objects, events, inspection result data including events and anomalies, data for cross-inspection comparisons, aerial view data of inspection coverage, image data and point cloud data with no events or anomalies detected, and other machine vision data not classified.

Figure 1:
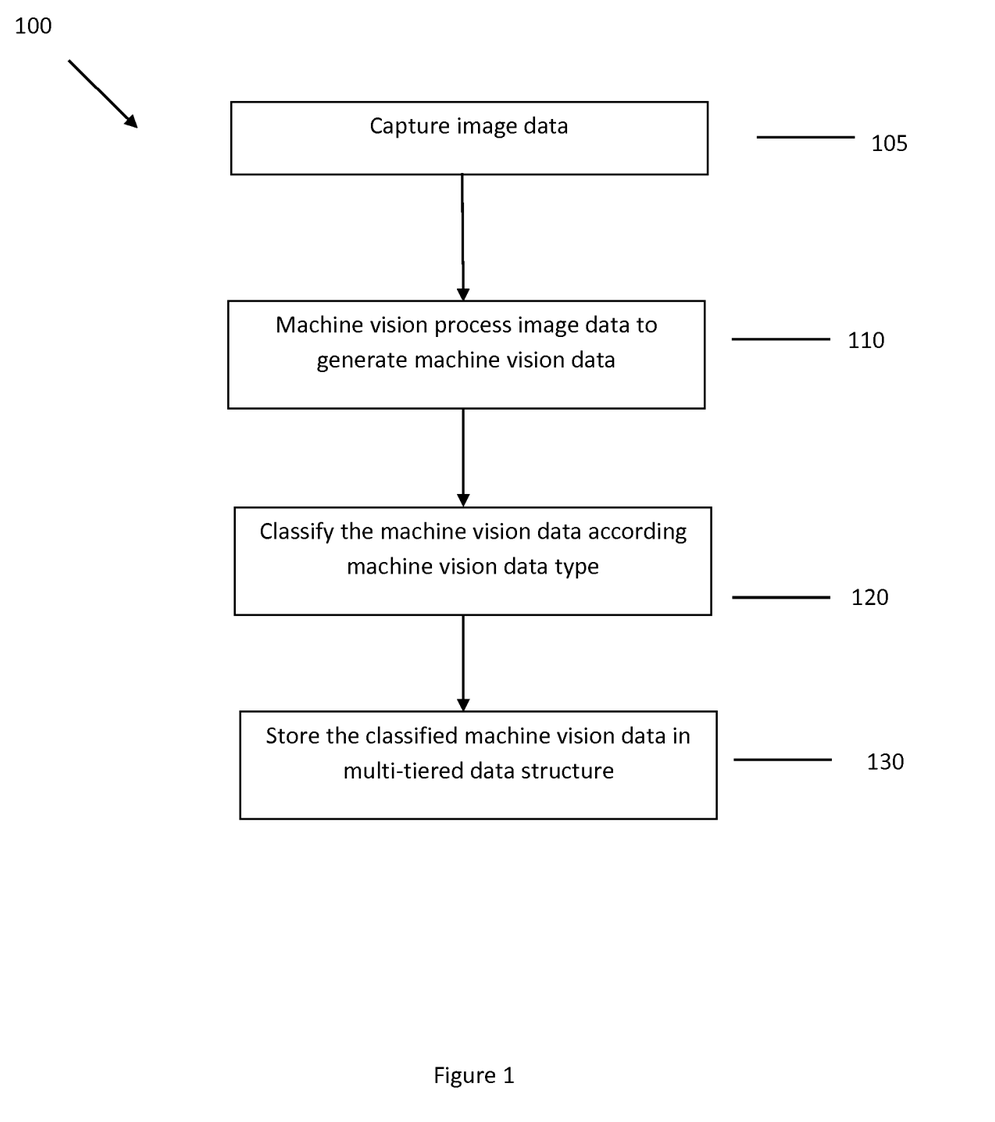
FIG. 1 is a flowchart illustrating a method of processing image data, according to an embodiment of the present disclosure.

FIG. 1 is a flowchart illustrating a method 100 for processing image data, according to an embodiment of the present disclosure. Referring to FIG. 1, the method 100 comprises capturing image data of multiple images of one or more scenes acquired under one or more lighting conditions 105, machine vision processing the image data to generate machine vision data 110; classifying the machine vision according to a type of the machine vision data 120; and storing the classified machine vision data in a multi-tiered data structure according to the machine vision data type, configured to enable each of the tiers of data to be processed independently of each other 130.

A description of the methodology of processing image data according to an embodiment of the present disclosure is provided as follows. Raw image data may be obtained using at least one suitable image acquisition device. The image data may be captured under at least one of white light, ultraviolet (UV) and laser sources. White light, UV and/or laser data may be captured for any scene in the vicinity of the at least one suitable image acquisition device. Thus, both 2D and 3D image data may be captured. The raw image data may be acquired from one or more fixed or moving platforms with one or more image acquisition devices. The raw image data may relate to one or more still images, or may represent a video sequence. The raw image data relates to one or more still images or a video sequence of one or more scenes. The raw image data relates to one or more still images or a video sequence captured under one or more lighting conditions. In the context of the present disclosure, still images are photographic images, typically digital. The resolution of the still images is typically higher than video, e.g. 8, 12.5, or 24 Megapixels (MP). Optical design is key to the acquisition of high quality still or video images. Raw image data may have inputs from multiple cameras or sensing tools, in particular where they are linked in time or another aspect, e.g., from the same machine. The multiple images and measurements may be acquired at a common geographical location and/or at the same time.

The image data may then be processed using machine vision techniques. A key feature of the present disclosure is the use of machine vision to analyse the captured images. As stated above, machine vision refers to the ability of a machine or computer to extract information from an image or a series of images and potentially to base machine decisions on the information extracted. Two scenarios may be envisaged. Still image data or video data may be processed LIVE and in real time. Alternatively, image data may be stored in a database and processed offline using specific image processing and machine vision tools following storage.

Specific machine vision techniques include:
Event detection
Object recognition
Object measurement
Object classification
Image to image correlation for common points
Optical flow measurements
Navigation correction Machine vision techniques may be employed to extract data relating to a scene represented by the raw image data. That is, machine vision algorithms may be used to obtain: a description of the scene and an area within the scene, reference coordinates, position, area, size, objects, events, and colour data. An embodiment of the present disclosure is that the use of sequences of images or light provide basis for generation of additional machine metadata through machine vision processing. That is, machine vision techniques may be employed for sequential imaging: capturing images under different light (e.g., white, UV, or Laser), thus adding additional information such as events found, and telemetry data such as range to object and size of object. A 3D point cloud data comprising a set of points may be extracted from a series of light profile images and mapped in space to provide a full 3D image of a scene. A 3D point cloud may be generated using photogrammetric techniques using a combination of still images and point cloud data.

The machine vision processing of the raw image data may comprise extracting metadata from the raw image data. The metadata may include any data that can be captured directly or indirectly. Such data may be referred to as direct metadata and indirect metadata as described above. Direct metadata relates to the image acquisition device settings used to take the photographic image. Such direct metadata may include the specifications, size, resolution or quality of the digital file, e.g. frame rate, exposure, depth of field, identification of image acquisition device, time and data stamp data, and temperature. Indirect metadata may include data obtained by other device or communication means as described above. For example, indirect metadata may include telemetry data obtained from other sensors internal or external to the image acquisition device. Such sensors may include a GPS sensor. The telemetry data may include geospatial, speed, altitude, pressure, and depth related data.

Machine vision functionality may be used to detect the scale of the image. Fixed light sources may be arranged to provide parallel illumination which serves as a reference to calibrate the field size being imaged. Preferably, this is done by using a structured light beam, for example, a pair of parallel laser lines. The lasers lines are a known, fixed distance apart; therefore by comparing that known distance to the images of the laser lines captured as part of the sequential imaging, it is possible to deduce the scale of the image.

Machine vision functionality can also deduce the range of the objects in the scene from the camera. This can be carried out in a number of ways, described in relation to the use of structured light beams as part of the sequential imaging.

Machine vision may also be used to detect objects within the scene. For example, by performing edge detection on a white light image, it is possible to detect the edges of objects in the image. Edge detection is a fundamental tool in machine vision, particularly in the areas of feature detection and feature extraction. An edge detection algorithm may comprise a set of mathematical steps which aim to identify points in a digital image at which the image brightness changes sharply or, more formally, has discontinuities. The points at which image brightness changes sharply are typically organised into a set of curved line segments termed edges.

Object detection is another useful machine vision tool. Object detection may be used for detecting certain objects that are expected to be present in the image. Machine vision techniques can tag the images with the objects that are contained therein. Furthermore, when combined with location information as to where the image was captured, it is possible to uniquely identify the particular object identified. This may be useful for comparisons with previous or subsequent images.

The machine vision data classification may comprise detecting machine vision data within an image and assigning a probability that it corresponds to a known machine vision data type. Multiple types of machine vision data within an image may be automatically detected, and assigned a probability that it corresponds to a known machine vision data type. In one embodiment, an object within an image may be automatically detected, and assigned a probability that it corresponds to a known object contained in a library of objects. An image acquisition device itself may have intelligence to change some parameters of lighting or image acquisition to improve this probability. For a high resolution image of 12.5 MP, the object in question may occupy only $\frac{1}{20}$ of the pixels or less than 5% of the volume of data.

Machine vision may also be used to correlate adjacent still images into a larger combined still image. That is, machine vision techniques may comprise correlating data between multiple images to enable storage, retrieval, and visualisation of each of the images. The raw image data of the multiple images may comprise at least one common feature between at least some of the multiple images. Another form of machine vision processing involves mosaicking. A mosaic is a set of still images stitched together to provide a larger 2D view of a scene. Mosaicking uses machine vision algorithms and mapping/mosaic rules to align still images and build up mosaic layers for presentation on a geographic information system (GIS) application or visualisation tool. Another machine vision technique may involve combining aspects from each of a plurality of images in a sequential image capture to form an augmented output image of the scene.

A major advantage of having the capability to process data in this way is that the volume of data can be considerably reduced. This facilitates transmission of key data from a remote location for example. For example, the reduced volume of data lends itself to low bandwidth transmission for remote control of a vehicle.

In a related application, to facilitate the transmission of data, pre-processing of images may be performed. For example, for real-time communication of event data from a remotely operated underwater vehicle (ROV), the potential to feed real-time range, scale and shape information from the vehicle to shore, allows decisions on shore to be made. This is more difficult where data volume transmission is restricted.

Non real-time applications include pre and post processing of survey data to capture events detected, type, and numbers of events, etc.

In an extension of this principle, by calculating the camera pose prior to transmission, images, compressed images or stripped images, may be transmitted with pose metadata to allow recalculation of a 3D mosaic. This may include a number of techniques using laser and white light images to generate 3D colour point cloud data mosaics or photogrammetery type reconstructions.

In addition, through using machine vision techniques, time and position based data on specific objects can be used to perform comparisons and analytics on specific events and objects.

Event detection is another type of machine vision technique. In computing, an event is regarded as an action or occurrence recognised by software that may be handled by the software. Event detection comprises identifying an event within an image using geometric algorithms or other measurement techniques. The techniques by which event information may be tagged in the images as described above are known as machine vision, computer vision or image processing. Such events may be classified and characterised.

To elaborate on the 3D image data, lines of laser data may be generated, the lines being at least separated in time and position. From these lines (1D) and line sets, structural changes in shape and statistics can be determined, that indicate the presence of specific events.

In the single line simple analysis of line statistics for example, max, min, mean and median, over one or multiple lines may yield some event data. Thresholds may be set around when to signal a specific machine vision data type, such as a certain event. Running cumulative totals allows "statistical" events to be extracted.

These machine vision data types represent a reduction of the original data set to a smaller sample set of data that can be reviewed manually for example.

In addition to 3D machine vision data found in this way, corresponding image sections (potentially from multiple images) may be assigned to this 3D data as metadata (linked by time and/or position) as images are acquired when laser is acquired.

Figure 2A:
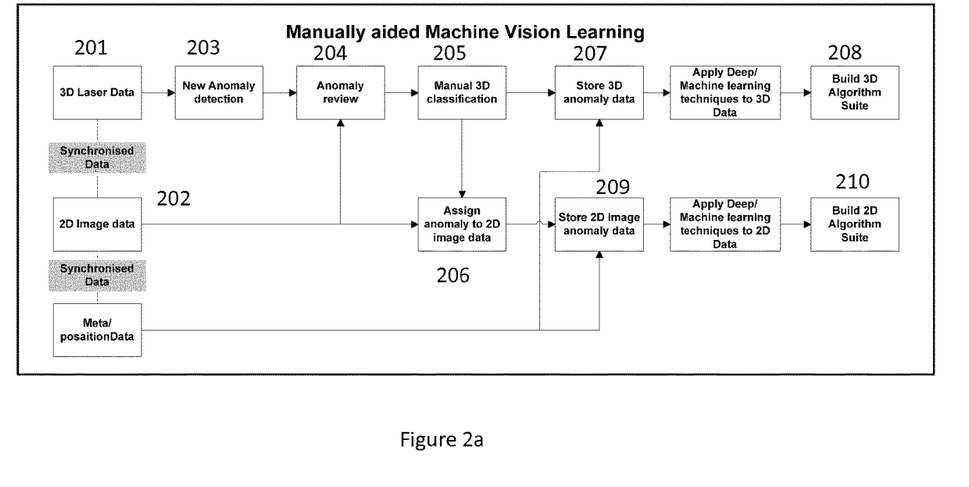
FIG. 2a is a flowchart diagram illustrating manually aided machine vision learning, according to an embodiment of the present disclosure.

FIG. 2a is a flowchart diagram illustrating manually aided machine vision learning, according to an embodiment of the present disclosure. Referring to FIG. 2a, 3D laser image data 201 and 2D image data 202 is acquired and machine vision processed to obtain machine vision data. Anomalies 203 may be detected in the 3D machine vision data. The anomalies may be reviewed 204. A user may then manually classify the anomalies found in the 3D machine vision data 205. Manual classification may be based on receipt of a user input at a user interface. The classified anomalies may be applied to the 2D machine vision data 206. Metadata and positional data may be applied to the classified 3D and 2D machine vision data. The 3D anomaly data may be stored 207 and applied to a 3D machine vision learning algorithm 208. Meanwhile when the classified anomalies are applied to or correlated with the 2D machine vision data 206, the 2D anomaly data may be stored 209 and applied to a 2D machine vision learning algorithm 210. As the amount of machine vision data relating to a given type is increased, the features can be used to train the 2D and 3D learning algorithms to further improve the ability of the system to automatically process data so that machine vision types can be classified automatically.

Figure 2B:
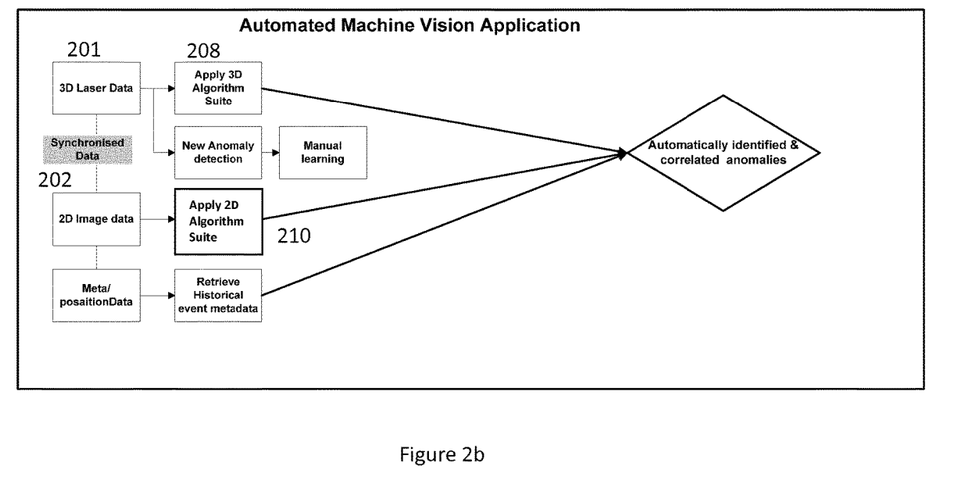
FIG. 2b is a flowchart diagram illustrating an automated machine vision application, according to an embodiment of the present disclosure.

FIG. 2b is a flowchart diagram illustrating an automated machine vision application, according to an embodiment of the present disclosure. Referring to FIG. 2b, 3D laser image data 201 and 2D image data 202 is acquired and machine vision processed to obtain machine vision data. The 3D and 2D data 201 and 202 is applied respectively to the 3D and 2D machine vision learning algorithms 208 and 210. In this manner, an automated system for classifying machine vision data is provided. As above, anomalies in the 3D data may be manually classified.

It will be understood by the person skilled in the art that a wide array of machine vision techniques may be used to analyse and derive useful data from images captured under the illumination of different light classes. The resultant machine vision data constitutes a rich data set.

The resultant classified machine vision data may be arranged in a hierarchical manner. That is, the machine vision data may be arranged based on data of interest, and data segregation may be based on importance/priority of data. Data may be stored in a structure which enables global access, usability, cost efficient implementation, and ability to scale as data grows. The data may be configured for easy retrieval and communication. The data may be accessed for reporting and business intelligence and easily integrated with third party tools and systems.

The machine vision data is classified into discrete blocks of data according to a type of the machine vision data. For example, the machine vision data may be classified according to at least one of priority, importance and access required of the machine vision data.

The machine vision data may in principle be machine classified (automatic classification) based on size, shape, positions, similarity to man-made (e.g. straight lines), or may also be classified manually. Both automatic and manual classifications may be used in an initial classification.

For example, in terms of shape classification, the shape of a line over a seabed, land, or other structures can be compared to other shapes, and ideal shapes in near real time. Averages and cumulative shape data can be used. This aspect of the machine vision detection relates to using laser data. By increasing the density of laser profile lines, or laser points in a raster system, the ability to process and detect changes in increased. Data might be in global world coordinates or in "time based" scanning formats (change over time).

2D machine vision comprises the detection and storage of events for example. The ability to acquire multiple images under different conditions increases the probability of a successful detection and classifications. Metadata, time, and position data linking the laser data above with the 2D images acquired at the same time, and particularly position data as determined from images, allows events found to be assigned and linked to this metadata. This increases the probability of success of finding an event reliably. By collecting data in this way, the ability to compare and enhance 2D classification is improved as manually or laser detected events can be better trained with additional data on all similar events. Further, by changing the parameters used to acquire images (e.g., light angle, intensity) the probability of detection can be improved. Finally, comparing to the ideal or historical data for that location, time or event, additional probabilities can be assigned.

Once classified, this classification "type" is stored with the 2D, 3D and all other relevant data sets for the same type but also stored in its geographical image, mosaic, map or point cloud in space. In this manner, a machine vision type may be assigned to each piece of machine vision data. Machine vision data found in this way, such as event data, may further be assessed in terms of acceptable features (size, volume, etc.) to allow anomaly detection, or out of acceptance criteria. Machine vision data classified in this way may be stored in a database as outlined below.

As the amount of machine vision data of a given type is increased, features thereof may be used to train learning algorithms to further improve the ability of the system to automatically process data so that machine vision data types can be classified automatically.

The classification includes classifying 3D data, 2D data and other metadata. A further aspect is for example, for machine vision data found in 3D data, the corresponding 2D image data sets can be found. The system may be configured to learn how to improve the automated processing of 2D machine vision for classification to further improve the success of correct classifications.

By teaching manually and automatically 2D events, and also 3D events, the accuracy of the system in predicting events increases. For example without 3D data analysis, the probability of success in finding specific machine vision data using only a white light feature might be 85%. By finding the same event in 3D it could be 90%. By teaching the system what the 2D and 3D feature sets that define this are, this probability can be increased to 98% for example. Further refining of the features further improves this.

The system, when optimised may have additional machine vision data that is not classified. By training the algorithms how to highlight and differentiate these features, the algorithms can be further refined to improve this probability further. A specific set of laser and/or white, red or UV image sets may be required to achieve this.

Finally, by finding lighting and laser conditions to find new events, the ability of the system to detect ALL events with near to 100% probability becomes feasible provided sufficient data collected in this way is provided to the system.

In an illustrative example, the probability of detecting an anode underwater can be as follows:

Conventional video: for 100 anodes=50%
Improved imaging with quality check and optimisation=65%
  Multiple images=70%
  Multiple images plus laser line stats=80%
  Multiple images plus laser shape data=95%
  Metadata, trained and optimsed=97%
  Historical data=99%
Refining acquisition parameters and reiteration as above=99.99%

Thus, it can be seen from the above example, that probability of correct machine vision classification is improved by considering how the image data is collected and parsed.

The classification and analysis methods described above may be performed in real time also. Furthermore, by performing the analysis in real time, decisions can be made on the data. This is particularly relevant to autonomous vehicles for navigation and decisions when "searching" for landmarks or waypoints for example. The logic applies to underwater but also to all types of image data acquisition. For example, a machine such as an autonomous vehicle may comprise suitable hardware and software components on board for processing the image data, generating the machine vision data and classifying the machine vision data. A database of the classified machine vision data may be accessed in real time within the machine to determine waypoints for navigation. An object such as a pipeline for example may be followed based on verifying the waypoints in real time.

Instead of just taking pictures, pictures and measurement data can be acquired. With measurements, general machine vision applied to 3D space can be built as a robust automation system. Also repeated inspections of the same location over time means that historical event data can be stored against absolute position. This enables the system to expect that anomaly to appear again at each repeated survey.

At the core of the system is the efficiency of data searching, storage, retrieval and visualisation. By acquiring, processing, storing, classifying and comparing to historical data, the system becomes reliable and efficient. The machine vision data itself then becomes the value in training future surveys for example.

As mentioned above, the machine vision data may be classified into discrete blocks of data according to the type of the machine vision data. The discrete blocks of classified machine vision data may be stored in a multi-tiered data structure configured to enable each of the discrete blocks of data to be processed independently of each other. More specifically, processing of the discrete blocks of data may comprise at least one of accessing, retrieval, transmission and analysis of one or more of the discrete blocks of data. The discrete blocks of data may be stored in separate storage repositories. The discrete blocks of data may be stored in higher or lower performance storage repositories corresponding to the type of each block of data. For example, the discrete blocks of data may be stored in higher or lower performance storage repositories corresponding to the level of at least one of priority, importance and access required. In one embodiment, the discrete blocks of data may comprise first, second and third tiers of data ranked in this order in diminishing rank of at least one of priority, importance and access required. The first tier of data may comprise inspection result data including at least one of: events and anomalies; and data for cross-inspection comparisons. The first tier of data may be stored on at least one high performance server. The second tier of data may comprise additional data to enhance the first tier of data. The second tier of data may comprise at least one of aerial view data of inspection coverage, and area data indicated as high risk/importance. The second tier of data may be stored on at least one low performance server. The third tier of data may comprise all other machine vision data. In this regard, the third tier of data may comprise image data and point cloud data with no events or anomalies detected. The third tier of data may be stored on at least one low cost storage solution such as a data tape. It will be understood that the above examples of first, second and third tiers of data are merely examples, and the machine vision data may be classified in other ways.

A link to the original raw image data may be stored along with the machine vision data. That is, in an embodiment of the present disclosure, a link to the originally captured image may be stored with the extracted machine vision data. The link may be associated with corresponding machine vision data extracted from the raw image data. This allows both the original raw image data and the extracted machine vision data to be related at a future time. This facilitates similar events to be compared over a given time or geographic region, or a comparison of the same event recorded at different times.

As explained above, machine vision refers to the ability of a machine or computer to extract information from an image or a series of images and potentially to base machine decisions on the information extracted.

Figure 3:
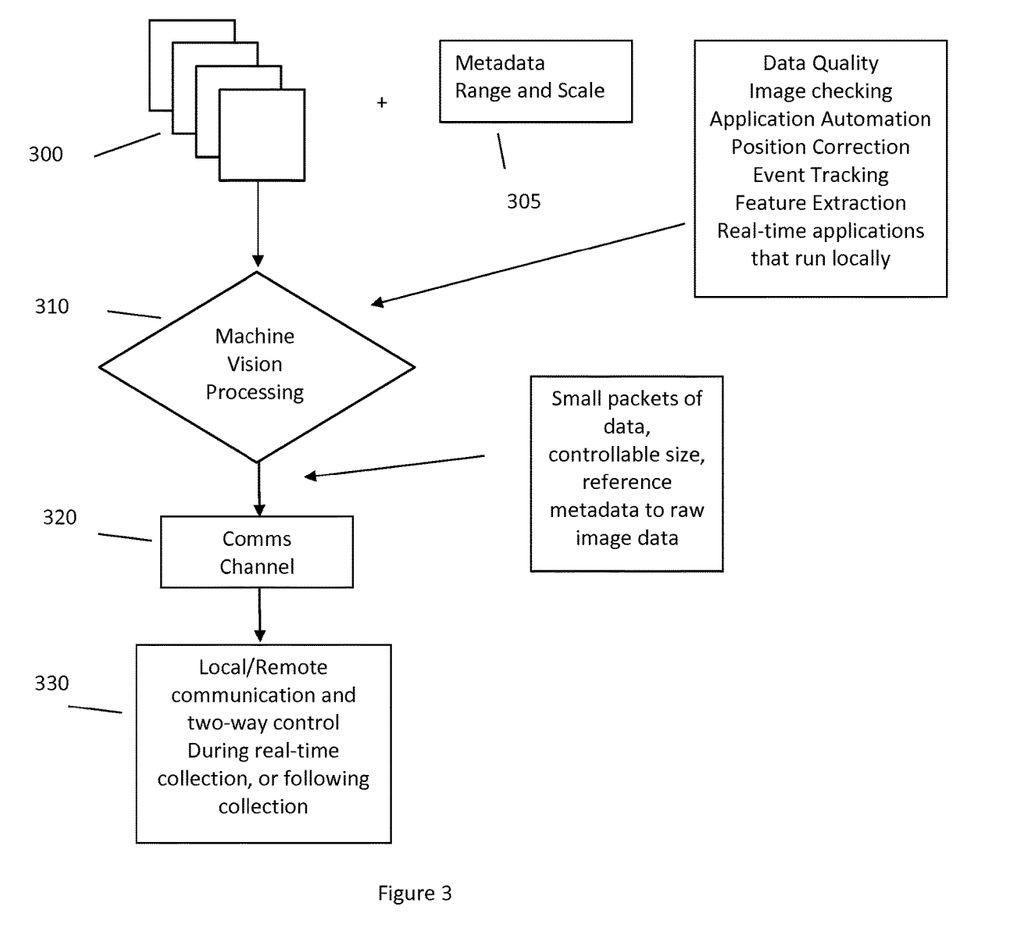
FIG. 3 is a diagram illustrating the method of processing image data, specifically, the processes to separate the data and data types, according to an embodiment of the present disclosure.

FIG. 3 is a diagram illustrating a method of processing image data, specifically, processes to separate the data and data types, according to an embodiment of the present disclosure. Referring to FIG. 3, in step 300, a plurality of images are acquired. In step 305, metadata, both direct and indirect metadata may be acquired in relation to the images. In step 310, machine vision processing is performed on the image data, thereby obtaining machine vision data. The machine vision processing may be performed by real-time applications that run locally at the location at which the image data is acquired. The machine vision data may then be transmitted via a communications channel in step 320. The machine vision data may be transmitted in small packets of data which have a controllable size, and may include reference metadata to raw image data. The machine vision data may be classified according to a type of the machine vision data. The machine vision data may be processed 330 at a local or central storage repository managing a single location or a plurality of locations. For example, a central database may collect data from multiple locations such as a plurality of ships, oil rigs, or subsea stations. The classification of the machine vision data may be performed locally or remotely.

The present disclosure relates to how large volumes of image and video data are processed from the raw image data acquired from an imaging device, classified, and broken down into smaller discrete blocks of data ('data of interest') and stored in a multi-tiered data structure. Because the discrete blocks of data are stored separately, efficient processing of one or more of the individual blocks of data independently of each other can be facilitated. That is, efficient access, retrieval, transmission and/or analysis of one or more of the discrete blocks of classified machine vision data may be effected.

By separating the important data and extracting it from an individual image, the most relevant data may be stored in a high performance storage system. Such "important data" may be configured to contain specific tags and linkages, that is, metadata. The metadata allows the important data to be retrieved from a search making the important data accessible for review, comparisons, reporting and business intelligence. Less important information may be stored in lower priority storage based on access needs. A link to the original image may remain with the extracted segment, allowing both to be related at a future time. For example, similar events may be compared over a given time or geographic region, or a comparison may be conducted of the same event recorded at different times.

In addition, a structured approach to processing images into smaller usable data blocks as described above, allows machine vision analysis of these images to divide the data so that additional decisions, including "data machine" decisions can be made.

Such "data machine vision", and the associated workflows and reporting are a key part of the present disclosure.

Still images and 3D point clouds may be streamed to a database in real-time as the data is acquired or offline where real-time connectivity to a database is not always available. Geospatial data, timestamps, metadata and telemetry data may be extracted and stored separately so that this data can be used as data indexes.

The images may be pre-processed to prepare them for the machine vision processing. Machine vision algorithms may be configured to perform a number of processing steps on the pre-processed data as part of event detection. Geometric algorithms are configured to search for specific events based on measurement. Object detection algorithms are configured to analyse the images for shapes and compare shapes found to a library of objects maintained on the database enabling classification and categorisation.

To manage the volume of data, a full data management system may be provided and configured for data prioritisation, segmentation and archiving on an ongoing basis.

The rich dataset resulting from the data capture, measurement and machine vision automation processes enables the data management system to segregate and prioritize survey data based on data of interest, e.g., events or anomalies found. This enables different storage solutions to be applied to each segment resulting in a more cost effective approach to data storage and retrieval.

In the tiered approach below Tier 1 and Tier 2 data may be <1% of the current storage requirements. The movement from video to high resolution still images may reduce the data volume to 10% of the video data. Further, when the identification of still image data with data of interest is conducted i.e. events & anomalies, the data volume may be reduced to about 1% of the video data.

| | |
|---|---|
| Tier 1 | Inspection results including events & anomalies |
| | Data for cross inspection comparisons |
| | Available on central high performance servers |
| Tier 2 | Additional data to enhance Tier 1 data including aerial view of inspection coverage, areas flagged as high risk/importance, etc. |
| | Available on central low performance storage |
| Tier 3 | All other data including raw image data and point clouds with no events or anomalies detected |
| | Inspections > X years old. |
| | Offsite low cost storage solution such as data tapes. |

The present disclosure provides a method whereby specific metadata is extracted, not only from white light images, but also images under different light conditions. The metadata is "machine vision" metadata that is associated with the original images. This is based on the fact that the metadata is recorded at the same "instant" in time (within a few milliseconds) or within the same "spatial" location (within a few cm). Other metadata such as geospatial data, time stamp data, etc. as described above may also be extracted. The present disclosure provides for extracting metadata from a sequence of images, with the objective of pulling associated and correlated machine vision data from the images.

The method of the present disclosure provides the ability to process large amounts of data automatically by machine vision techniques instead of using manual "eye/brain" based techniques. How data is stored, with the associated metadata from secondary and other images is fundamental to this. Instead of capturing video as just video, or still images as pictures, secondary data may be acquired that provide other information about the scene. For example, the distance from the imaging device to the object and the scale of each object in the picture can be recorded by the imaging device. By storing this data in the database, each object found may be assigned specific attributes. Examples of such attributes include size, colour, and shape, as well as statistics on how many instances of the object were found over a given range.

An example of where the method and system of the present disclosure may be applied is offshore imaging. In offshore operations, specific "events" may be identified automatically, and can be filtered and communicated to shore without sending the full image data set.

Figure 4:
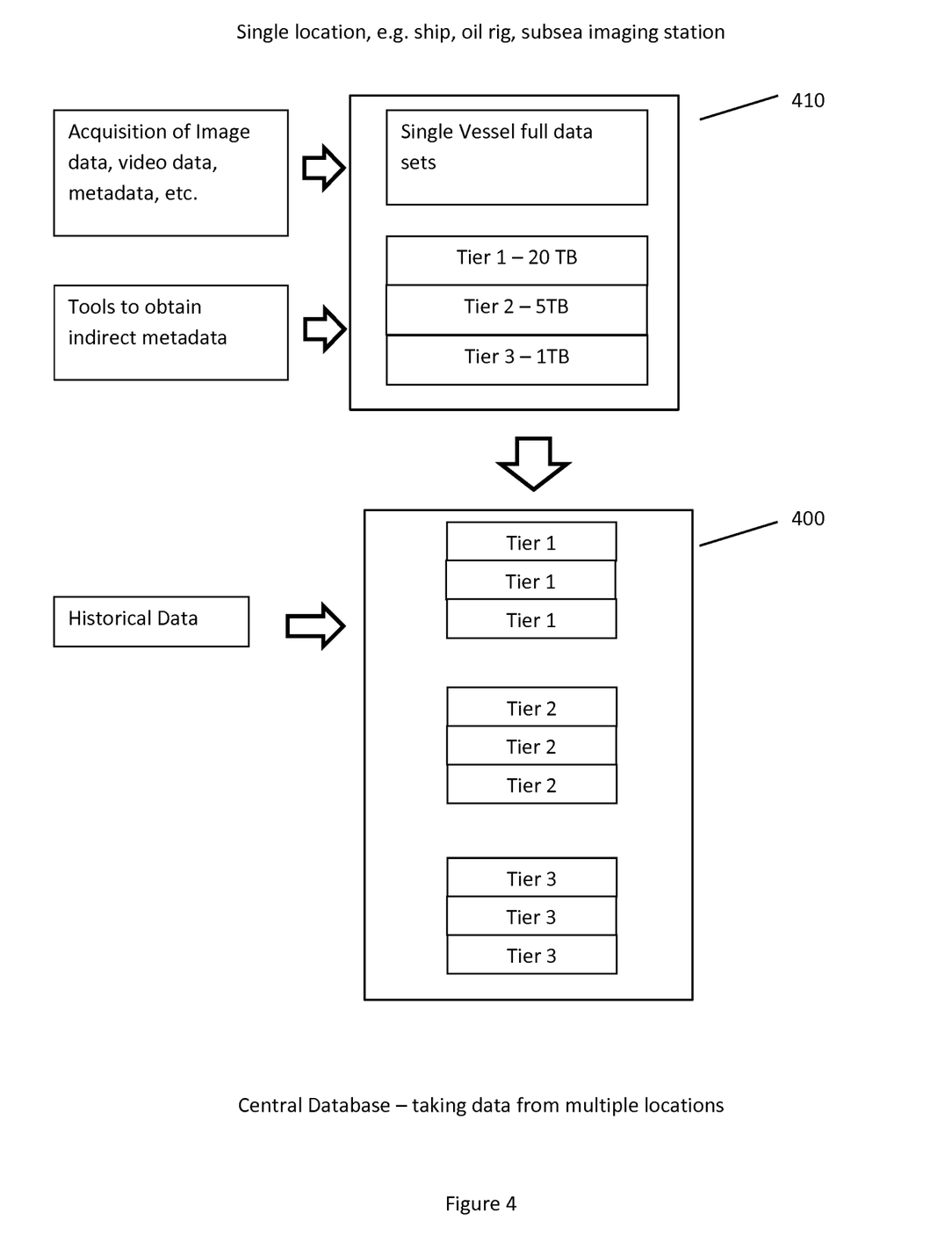
FIG. 4 is a diagram illustrating an example of where the method can be applied in a multi-ship operation with each ship having a database with tiers for storing data, according to an embodiment of the present disclosure.

FIG. 4 is a diagram illustrating an example of where the method of the present disclosure can be applied in a multi-ship operation with each ship having a database with tiers for storing data, according to an embodiment of the present disclosure. Referring to FIG. 4, a database 410 associated with a single vessel may store machine vision data as described above, that is, in a multi-tiered approach. The size of the total machine vision data in the database 410 may be 100 terabytes (TB). In the example shown, the Tier 1 data comprises 20 TB, the Tier 2 data comprises 5 TB, and the Tier 3 data comprises 1 TB. Referring to FIG. 4, a central multi-vessel database 400 may store data collected from multiple vessels. Historical data acquired may also be stored in the central multi-vessel database 400. As shown, the central multi-vessel database 400 may be configured to store all the Tier 1 data from the plurality of vessels together, all the Tier 2 data together, and all the Tier 3 data together, respectively.

A further benefit of the approach is that for cloud-based communication and data management, the multi-tiered data structures provide mechanisms to link data efficiently and to allow users to download only the most relevant data sets.

Finally, by merging data sets from machine vision outputs, the number of events and objects can be increased, and better classified. This approach is useful for applications in integrity management, business analytics, and defense intelligence. Machine vision data may be classified and stored in a non-subjective manner.

The present disclosure also provides a system for processing image data, the system comprising a processor configured to perform any of the above-described method steps. The system may comprise one or more storage components configured to store the discrete blocks of classified machine vision data.

Figure 5:
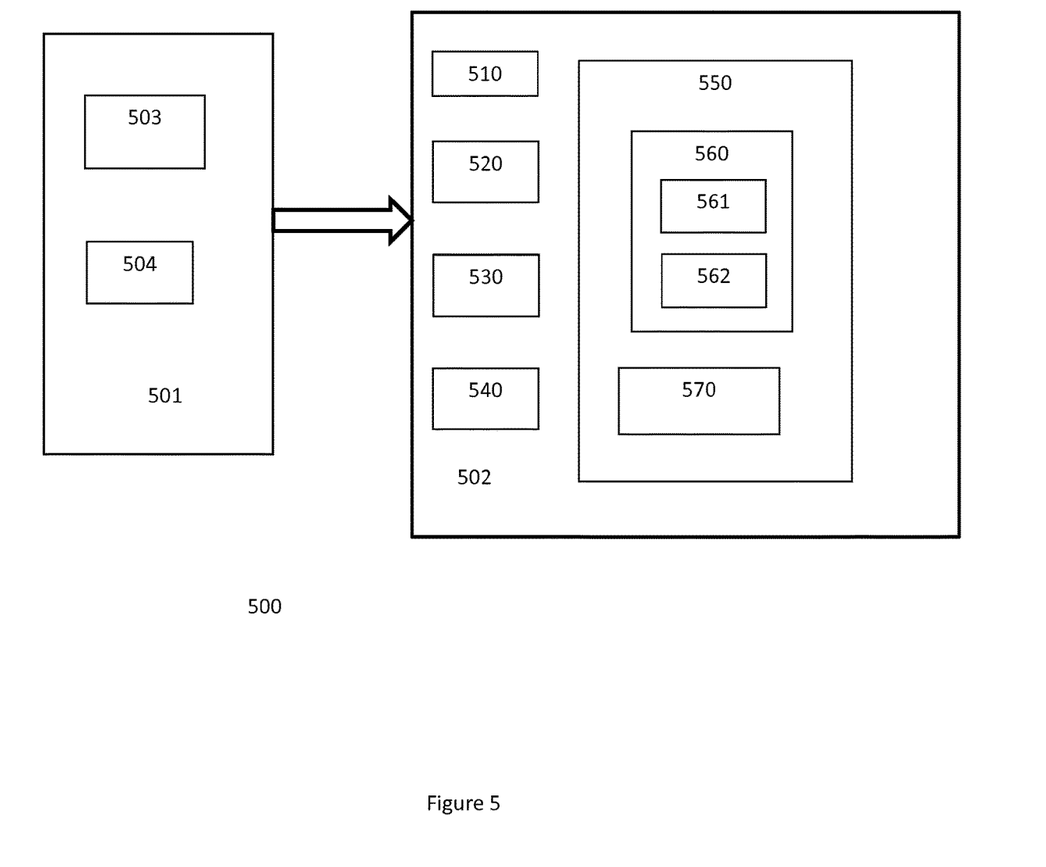
FIG. 5 is a block diagram illustrating a system configured for processing image data, according to an embodiment of the present disclosure.

FIG. 5 is a block diagram illustrating a configuration of a system 500 configured to perform the methods disclosed herein, according to an embodiment of the present disclosure. The system 500 includes various hardware and software components that function to perform the methods according to the present disclosure. Referring to FIG. 5, the system 500 comprises an imaging module 501 and a data processing module 502. The imaging module 501 may comprise one or more image acquisition devices. The raw image data may be captured from one or more fixed or moving platforms with the one or more image acquisition devices. The imaging module 501 comprises a light module 503 and a camera module 504. The light module 503 may comprise a plurality of light classes, each light class having one or more different light sources as described above. The data processing module 502 includes machine vision functionality and data storage capability. In use, images are captured by the imaging module 501 and processed by the data processing module 502. As mentioned above, the machine vision data may be transmitted to a local or central storage repository managing a single location or a plurality of locations. For example, a central database may collect data from multiple locations such as a plurality of ships, oil rigs, or subsea stations. The classification of the machine vision data may be performed locally or remotely. That is, the data processing module 502 may be located locally at the location where the images are captured, or at a remote location.

For subsea stations, while not moving, data processing using machine vision techniques in this way provides robust and reliable "alarm" signals. By setting thresholds on one or more devices, a large number of devices can be configured to automatically monitor for change for example. Robust alarm conditions can be learned over time as "false alarm" conditions are learned. Furthermore, for an array of multiple such imaging devices for example, the volume of data is considerably reduced to "events" making it feasible for image based monitoring without the data overhead.

The data processing module 502 includes a user interface 510, a processor 520 in communication with a memory 550, and a communication interface 430. The processor 520 functions to execute software instructions that can be loaded and stored in the memory 550. The processor 520 may include a number of processors, a multi-processor core, or some other type of processor, depending on the particular implementation. The memory 550 may be accessible by the processor 520, thereby enabling the processor 520 to receive and execute instructions stored on the memory 550. The memory 550 may be, for example, a random access memory (RAM) or any other suitable volatile or non-volatile computer readable storage medium. In addition, the memory 550 may be fixed or removable and may contain one or more components or devices such as a hard drive, a flash memory, a rewritable optical disk, a rewritable magnetic tape, or some combination of the above. In this regard, the memory 550 may comprise a plurality of storage repositories configured to store the multi-tiered machine vision data. That is, a first storage repository of the memory 550 may be configured to store the first tier of data described above. A second storage repository of the memory 550 may be configured to store the second tier of data described above. A third storage repository of the memory 550 may be configured to store the third tier of data described above. The first storage repository may be a high performance memory server. The second storage repository may be a low performance memory server. The third storage repository may be a low cost solution such as data tape. However, as mentioned above, the classified machine vision data may be transmitted to a local or central storage repository managing a single location or a plurality of locations. Further, the classification of the machine vision data may be performed locally or remotely.

One or more software modules 560 may be encoded in the memory 550. The software modules 560 may comprise one or more software programs or applications 561 and 562 having computer program code or a set of instructions configured to be executed by the processor 520. Such computer program code or instructions for carrying out operations for aspects of the systems and methods disclosed herein may be written in any combination of one or more programming languages.

Other information and/or data relevant to the operation of the present system and methods, such as a database 570, may also be stored in the memory 550. The database 570 may contain and/or maintain various data items and elements that are utilized throughout the various operations of the method and system described above.

The present disclosure relates to how large volumes of image data are processed and broken down into smaller discrete blocks of data and stored in a multi-tiered data structure, thereby enabling efficient storage, access, retrieval, transmission and analysis of image data. The storage and detection of machine vision features for assembly into a data structure allows efficient storage, retrieval, visualisation, and analysis, but core to the data segregation being robust is the methods used to fill the data structure. The probability of correct machine vision classification is improved by considering how the image data is collected.

The words comprises/comprising when used in this specification are to specify the presence of stated features, integers, steps or components but does not preclude the presence or addition of one or more other features, integers, steps, components or groups thereof.

What is claimed is:

1. A method of processing image data captured from fixed or moving platforms with one or more image acquisition devices, comprising:
   capturing raw image data of multiple images of one or more scenes under one or more lighting conditions with one or more image acquisition devices;
   machine vision processing the raw image data to generate machine vision data;
   classifying the machine vision data according to a machine vision data type to create classified machine vision data;
   storing the classified machine vision data in tiers comprising a multi-tiered data structure according to the machine vision data type, configured to enable each of the tiers of data to be processed independently of each other;
   classifying the machine vision data into discrete blocks of data according to at least one of priority, importance and access required of the machine vision data;
   wherein the discrete blocks of data comprise first, second and third tiers of data ranked in this order in diminishing rank of said at least one of priority, importance and access required of the machine vision data;
wherein
the first tier of data comprises at least one of:
inspection result data including events and anomalies, and
data for cross-inspection comparisons;
the second tier of data comprises at least one of:
additional data to enhance the first tier of data,
aerial view data of inspection coverage, and
area data indicated as high risk importance; and
the third tier of data comprises all other machine vision data not classified in the first or second tier, or image data and point cloud data with no events or anomalies detected.

2. The method of claim 1, wherein the raw image data comprises at least one of 2D image data and 3D image data.

3. The method of claim 1, wherein the machine vision processing the raw image data to generate machine vision data comprises generating at least one of 2D machine vision data and 3D machine vision data.

4. The method of claim 1, wherein the classifying the machine vision data according to the machine vision data type comprises at least one of automatic machine vision classification and manual classification.

5. The method of claim 1, comprising applying at least one of 2D machine vision data and 3D machine vision data to respectively generate at least one of a 2D machine vision learning algorithm and a 3D machine vision learning algorithm.

6. The method of claim 5, wherein the 2D machine vision learning algorithm and/or 3D machine vision learning algorithm are trained according to the receipt of machine vision data of a given type.

7. The method of claim 5, comprising training the 2D machine vision learning algorithm and/or 3D machine vision learning algorithm according to historical classified machine vision data.

8. The method of claim 1, comprising correlating 2D machine vision data with 3D machine vision data to improve the success of accurate classification of the machine vision data.

9. The method of claim 1, wherein the machine vision processing the raw image data comprises performing at least one of event detection, object recognition, object measurement and object classification on the raw image data.

10. The method of claim 1, wherein the machine vision processing the raw image data comprises performing at least one of geometric algorithms, object detection algorithms, and event detection algorithms on the raw image data.

11. The method of claim 1, wherein the acquisition of the raw image data comprises use of sequences of images or light to generate additional metadata.

12. The method of claim 1, wherein the machine vision processing comprises correlating data between multiple images to enable storage, retrieval, and visualisation of each of the images.

13. The method of claim 1, wherein the image data is captured under at least one of white light, ultraviolet (UV) and laser sources.

14. The method of claim 1, wherein the storing the classified machine vision data in the multi-tiered data structure comprises storing discrete blocks of data in separate storage repositories.

15. The method of claim 14, comprising storing the discrete blocks of data in higher or lower performance storage repositories corresponding to the level of said at least one of priority, importance and access required of the machine vision data.

16. The method of claim 1, further comprising storing a link to the raw image data.

17. The method of claim 1, wherein the raw image data comprises still image data or video data.

18. The method of claim 1, wherein independent processing of each of the tiers of data comprises at least one of storage, access, retrieval, transmission and analysis of the tiers of data.

19. The method of claim 1, comprising storing the machine vision data in a local storage repository managing a single location.

20. The method of claim 1, comprising storing the machine vision data in a central storage repository managing a plurality of locations.

21. The method of claim 1, wherein the machine vision processing is performed in real-time at the location at which the image data is acquired.

22. The method of claim 1, wherein the classification of the machine vision data is performed locally or remotely.

23. The method of claim 1, wherein the machine vision data classification comprises detecting machine vision data within an image and assigning a probability that it corresponds to a known machine vision data type.

24. A system for processing image data captured from fixed or moving platforms with one or more image acquisition devices, the system comprising:
one or more image acquisition devices configured to capture raw image data of multiple images of one or more scenes under one or more lighting conditions; and
at least one processor configured to:
machine vision process the raw image data to generate machine vision data;
classify the machine vision data according to a machine vision data type to create classified machine vision data; and
store the classified machine vision data in tiers comprising a multi-tiered data structure according to the machine vision data type, configured to enable each of the tiers of data to be processed independently of each other;
classify the machine vision data into discrete blocks of data according to at least one of priority, importance and access required of the machine vision data;
wherein the discrete blocks of data comprise first, second and third tiers of data ranked in this order in diminishing rank of said at least one of priority, importance and access required of the machine vision data;
wherein
the first tier of data comprises at least one of:
inspection result data including events and anomalies, and
data for cross-inspection comparisons;
the second tier of data comprises at least one of:
additional data to enhance the first tier of data,
aerial view data of inspection coverage, and
area data indicated as high risk importance; and
the third tier of data comprises all other machine vision data not classified in the first or second tier, or image data and point cloud data with no events or anomalies detected.

25. The system of claim 24, comprising one or more storage repositories configured to respectively store the tiers of data.

26. The system of claim 24, further comprising a light module and a camera module.

27. The system of claim 26, wherein the light module comprises at least one of white light, ultraviolet (UV) and laser sources.

* * * * *